United States Patent [19]
Yaffe

[11] Patent Number: 5,604,828
[45] Date of Patent: Feb. 18, 1997

[54] MULTI-PURPOSE OPTICAL INTEGRATED CIRCUIT

[75] Inventor: Henry H. Yaffe, Dunwoody, Ga.

[73] Assignee: Lucent Technologies Inc., Murray Hill, N.J.

[21] Appl. No.: 560,754

[22] Filed: Nov. 21, 1995

[51] Int. Cl.$^6$ .................... G02B 6/12; G02B 6/28
[52] U.S. Cl. .................. 385/14; 385/24; 385/48; 359/114; 359/115
[58] Field of Search .................. 385/14, 20–24, 385/46, 48; 359/114, 115, 124, 127

[56] References Cited

U.S. PATENT DOCUMENTS

| | | | |
|---|---|---|---|
| 4,483,582 | 11/1984 | Sheem | 385/24 |
| 4,904,042 | 2/1990 | Dragone | 350/96.16 |
| 5,136,671 | 8/1992 | Dragone | 385/46 |
| 5,285,305 | 2/1994 | Cohen et al. | 359/110 |
| 5,309,534 | 5/1994 | Cohen et al. | 385/27 |
| 5,438,444 | 8/1995 | Tayonaka et al. | 385/24 |
| 5,500,910 | 3/1996 | Boudreau et al. | 385/24 |

Primary Examiner—John D. Lee
Assistant Examiner—Phan T. H. Palmer

[57] ABSTRACT

An optical integrated circuit provides multiple power splitting functions and comprises a plurality of optical power splitters networked together. In one embodiment, the optical integrated circuit has two 2×2 optical power splitters ganged together such that the circuit simultaneously provides two different 1×2 power splitting functions and four different 1×3 power splitting functions. In another embodiment, the optical integrated circuit has three 2×2 optical power splitters ganged together such that the circuit simultaneously provides two 1×2 power splitting functions, four 1×3 power splitting functions, and two 1×4 power splitting functions. Since each integrated circuit provides more than one power splitting function, the integrated circuit is more versatile than a single power splitter. The integrated circuit may also present a lower cost in comparison to a circuit formed with discrete elements since additional power splitters can be placed on a single substrate for only a nominal increase in cost. The integrated circuit further reduces the time needed to couple fibers to their respective power splitters since multiple fibers in a fiber ribbon array can be simultaneously coupled to the ports of the optical integrated circuit.

25 Claims, 2 Drawing Sheets

MULTI-PURPOSE OPTICAL INTEGRATED CIRCUIT

FIELD OF THE INVENTION

This invention relates to an optical integrated circuit and, more particularly, to a multi-purpose optical integrated circuit having interconnected optical splitters with multiple functionalities.

BACKGROUND OF THE INVENTION

A power splitter is a commonly used component in many optical circuits and systems, including many communication systems. In general, a power splitter divides light from one or more input ports into two or more portions and routes these two or more portions of light to two or more output ports. The simplest power splitter is a 1×2 power splitter wherein light from one input port is divided and routed to two output ports.

The power splitter is bi-directional in that light can enter or exit any port in the power splitter. The ports of the power splitter can either be an "input" port or an "output" port, depending upon the direction in which the light travels. Consequently, for the purposes of this description, a port will be designated as an input port if light is being received at that port and as an output port if the light is being emitted at that port.

With a 1×2 power splitter, the light on the input port is divided into two portions according to any determined fixed ratio. For instance, one common ratio is 50/50 which means that light entering one port will be divided into one portion which is nominally 50% of the entering light and into another portion which is nominally 50% of the entering light. Another common ratio for a power splitter is 67:33 whereby light is divided into two portions which are 67% and 33% of the entering light power, respectively.

A power splitter, however, is not limited to just a 1×2 splitter, but may be designed to divide light from its input port into more than two output ports. Along these lines, in some applications, light from one source needs to be equally divided and routed to more than two locations, such as to three locations. A 1×3 power splitter would therefore be used to divide the input light into three parts. An example of a ratio for this type of power splitter may be designated 33:33:33. The ratio 33:33:33 indicates that the splitter is designed to split the entering light into three portions of 33%. Also, another common type of optical power splitter is a 1×4 power splitter having a ratio of 25:25:25:25 for dividing input light into four equal portions.

A power splitter can have other design variations as well. For instance, some power splitters are four port devices with two ports being placed on either side of the power splitter. When light is received into either one of the ports on one side of the power splitter, the power splitter divides the light into two portions according to a fixed ratio and routes the two portions of light to the two output ports on the other side of the power splitter.

Typically, a power splitter is individually fabricated from single mode optical fibers to have a certain fixed ratio. The fused biconic taper (FBT) is a common technique used to fabricate power splitters. The FBT is fabricated from two fibers which have been joined in such a manner that light is coupled between the two fibers according to the fixed ratio. The fabrication process involves the steps of heating the two fibers, joining the two fibers together, pulling the fibers until the desired amount of coupling is achieved, cooling the fibers, and packaging the fragile device to protect it from the environment. If light is divided into more than two portions, then additional FBT fiber couplers are cascaded to provide the additional division of light.

Because each power splitter is individually fabricated, the ratio can be precisely set for a given application. For instance, a first power splitter may be formed as a 67:33 power splitter, a second power splitter may be formed as a 50:50 power splitter, and a third power splitter may be formed as a 33:33:33 power splitter by fusing three fibers together. Making power splitters with more than two equal power ports on each side, for example a 1×3 power splitter, using FBT is very complicated and expensive. Further, for such desired larger splits and for unbalanced power splitting, FBT couplers are cascaded together to form a power splitting circuit. Furthermore, the splitting ratio of FBT power splitters are not uniform across all wavelengths of interest. Nonetheless, the individual fabrication of each discrete FBT power splitter has an advantage of being able to custom design the desired split ratio of each device.

The serial fabrication of individual FBT power splitters, however, causes the cost of the power splitters to be relatively high. This is especially true for compound power splitter optical circuits requiring the division of light into more than two portions, since these circuits would have an even greater cost due to the use of more than one power splitter concatenated end to end, or the use of power splitters which are comprised of more than two fibers, which are necessarily more expensive due to the more extensive fabrication process and the added cost of interconnecting the different power splitters one to the other. A need therefore exists for a power splitter which is relatively inexpensive.

SUMMARY OF THE INVENTION

The present invention, in a preferred embodiment thereof, is an optical circuit which has first to sixth optical ports with each of the ports being able to both input light to the circuit and output light from the circuit. The circuit has two power splitters with the first power splitter connected to the first, second, and fourth ports and to the second power splitter. The first power splitter operates such that light from the first port or second port is split with a first fraction of the light going to the fourth port and a second fraction of the light going to the second power splitter. Also, light entering from the fourth port or exiting from the second power splitter is divided by the first power splitter with an amount equal to the first fraction of the light going to the first port and an amount equal to the second fraction going to the second port.

The second power splitter is connected to the third, fifth, and sixth ports and to the first power splitter. The second power splitter operates such that light from the fifth port or sixth port is split with a third fraction of the light going to the first power splitter and a fourth fraction of the light going to the third port. Also, light from the first power splitter or the third port is split with an amount equal to the third fraction going to the fifth port and an amount equal to the fourth fraction going to the sixth port.

The optical power splitting network circuit advantageously provides more than one power splitting function and at least provides a 1×2 power splitting function and a 1×3 power splitter function. In a preferred embodiment, the optical circuit can operate as a 50:50 power splitter, a 67:33 power splitter, a 50:33:17 power splitter, or a 33:33:33 power splitter.

3

In another embodiment, an optical circuit is preferably fabricated from a network of three 50:50 power splitters which are interconnected such that light entering the circuit through one of the ports can be divided according to the following ratios: 50:50, 50:25:25, or 25:25:25:25. Thus, the optical power splitting network circuit, according to this embodiment, can operate as a 1×2 power splitter, a 1×3 power splitter, or a 1×4 power splitter.

The optical circuits according to the invention are relatively inexpensive since they are fabricated as optical integrated circuits. The cost for fabricating a power splitter networks on a single planar substrate is fairly low, as many such power splitter networks can be formed simultaneously. Because the optical power splitting network circuits provide more than one power splitting function, a supply of a variety of power splitters can be kept while maintaining in inventory only one type of network circuit. Also, the optical integrated circuit according to the invention can be joined to optical fibers with each port on the optical integrated power splitting network circuit being coupled to a fiber.

In general, the invention is an optical circuit which has N+M total ports; N on one side and M on the other side. This circuit is formed by a network of fixed power splitters having equal or differing splitter ratios. The outputs of the individual splitters serve as either inputs to a subsequent splitter or become one of the ports of the compound splitter network circuit. The network of splitters can function as a variety of different splitters, both simple and complex, and may also simultaneously function as a number of splitters in parallel. The optical function of the network of splitters is determined by assigning specific ports to be inputs and other ports to be the outputs. As a result, the same network circuit of fixed splitters can be used for a variety of different applications.

The principles and features of the present invention will be more readily apparent and understood from the following detailed description, read in conjunction with the accompanying drawings.

DETAILED DESCRIPTION

Figure 1:
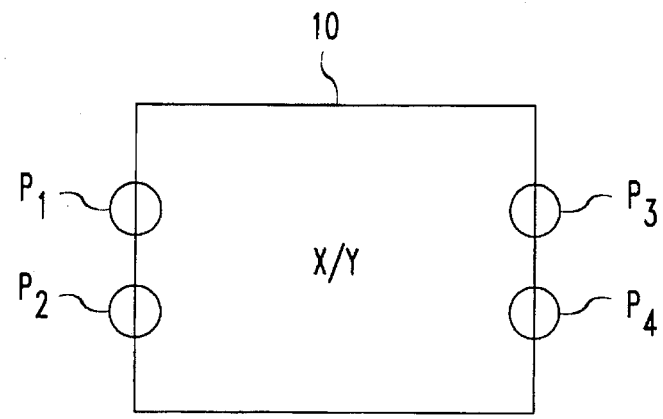
FIG. 1 is a block diagram of a 2×2 power splitter.

With reference to FIG. 1, an optical power splitter 10 has two ports $P_1$ and $P_2$ on one side of the power splitter 1 and two ports $P_3$ and $P_4$ on the other side. The optical power splitter 10 is characterized as having a power splitting fraction of X:Y where the sum of X and Y is equal to 100. The power splitter 10 operates such the light entering port $P_1$ will be divided with X % of the light exiting from port $P_4$ and Y % of the light exiting from port $P_3$. The light entering port $P_2$ will be divided with X % of the light exiting from port $P_3$ and Y % of the light exiting from port $P_4$.

In general, light crossing the power splitter 10 diagonally, such as light from port $P_1$ to port $P_4$ or light from port $P_2$ to port $P_3$, is called the cross-state and exits from the splitter 10 with X % of the optical power. The light that traverses the power splitter 10 straight across, such as light from port $P_1$ to port $P_3$ or light from port $P_2$ to port $P_4$, is called the bar state and exits the splitter 10 with Y % of the optical power.

4

Thus, the value of X can be found to be equal to the ratio of the optical power at the fourth port $P_4$ to the power at the first port $P_1$ and to be equal to the ratio of the optical power at the third port $P_3$ to the power at the second port $P_2$. In a similar manner, the value of Y can be found to be equal to the ratio of the optical power at the third port $P_3$ to the power at the first port $P_1$ and to be equal to the ratio of the optical power at the fourth port $P_4$ to the power at the second port $P_2$.

Figure 2:
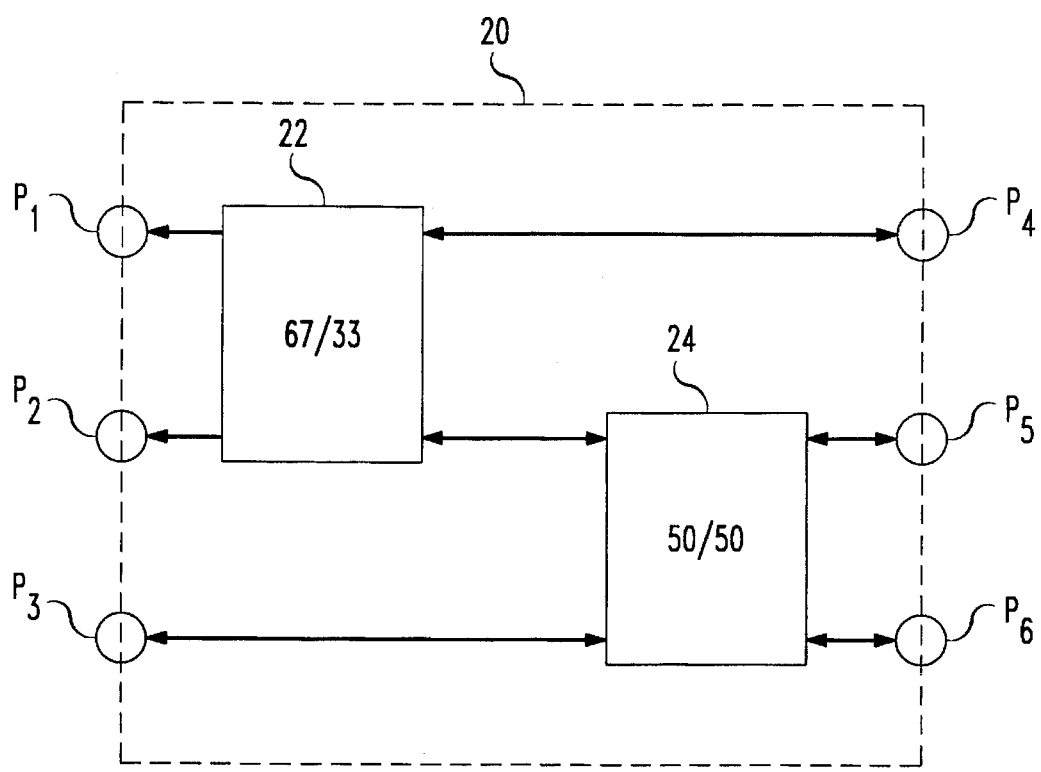
FIG. 2 is a block diagram of an optical integrated circuit according to a first embodiment of the invention.

With reference to FIG. 2, an optical power splitting circuit 20 according to a first embodiment of the invention comprises a first power splitter 22 and a second power splitter 24. The first power splitter 22 is connected to first and second ports $P_1$ and $P_2$ of the optical circuit 20 on one side and to a fourth port $P_4$ and to the second power splitter 24 on its other side. When light enters the fourth port $P_4$, the light is divided by the first power splitter 22 into two portions with the first portion equal to 33% of the power going to the first port $P_1$ and a second portion equal to 67% of the power going to the second port $P_2$. Thus, when light enters the fourth port $P_4$, the optical power splitting network circuit 20 operates as a 1×2 power splitter having a ratio of 67:33.

The second optical power splitter 24 is connected to the first optical power splitter 22 and to a third port $P_3$ on its one side and to fifth and sixth ports $P_5$ and $P_6$ on its other side. When light enters the third port $P_3$, the light is divided by the second power splitter 24 into two equal portions and routed to the fifth and sixth ports $P_5$ and $P_6$. Thus, in addition to operating as a 1×2 power splitter having a ratio of 67:33, the optical power splitting network circuit 20 can also operate as a 1×2 power splitter having a ratio of 50:50.

In addition to providing two different 1×2 power splitting functions, the optical circuit 20 also provides four different 1×3 power splitting functions. A first 1×3 power splitting function occurs when light enters the first port $P_1$ and is divided into two portions by the first power splitter 22. A first portion of the light equal to 33% of the power is routed to the fourth port $P_4$ and a second portion of the light equal to 67% of the power is routed to the second power splitter 24. At the second power splitter 24, the light is divided into two equal portions which are routed to the fifth and sixth ports $P_5$ and $P_6$. Thus, when light enters the first port $P_1$, the light is divided into three equal portions which are output on ports $P_4$ to $P_6$.

A second 1×3 power splitting function occurs when light enters the sixth port $P_6$. The light entering the sixth port $P_6$ is first divided into two equal portions by the second power splitter 24 with 50% of the power going to the third port $P_3$ and the other 50% of the light going to the first power splitter 22. The first power splitter 22 divides the light into two portions and routes the two portions to the first and second ports $P_1$ and $P_2$. The first port $P_1$ receives 17% of the total light while the second port $P_2$ receives 33% of the total light. The optical circuit 20 can therefore operate as a 1×3 power splitter having a 50:33:17 power splitting ratio.

The third power splitting function occurs when light enters at the second port $P_2$. As is apparent from FIG. 2, the light entering the second port $P_2$ is divided by the first power splitter 22 with 67% of the power exiting from the fourth port $P_4$ and 33% of the light entering the second power splitter 24. The second power splitter 24 divides the entering light evenly between the two ports $P_5$ and $P_6$. The third power splitting function therefore provides a 67:16.5:16.5 power splitting ratio.

The fourth power splitting ratio occurs when light enters the fifth port $P_5$ and is divided into two equal portions by the second power splitter 24 and routed to the first power splitter 22 and to the third port $P_3$. The first power splitter 22 divides the light at 50% total power and routes approximately 33% of the total power to the first port $P_1$ and 17% to the second port $P_2$. Thus, the fourth power splitting ratio is equal to 50:33:17.

The first and second power splitters 22 and 24 and the interconnections between the power splitters 22 and 24 and the ports $P_1$ to $P_6$ are all fabricated as an optical integrated circuit, such as one on a planar waveguide chip. The fabrication of the optical integrated circuit 20 on a single substrate is within the capability of one of ordinary skill in the art and, accordingly, will not be described in any further detail. The optical circuit 20 is preferably manufactured by planar waveguide technology, which is described in more detail in U.S. Pat. No. 4,902,086, to Henry et al., which is hereby incorporated by reference.

While the optical power splitter network circuit 20 is preferably fabricated with planar waveguide circuit technology, the circuit 20 may be fabricated in any suitable manner. With planar waveguide circuit technology, the desired splitters as well as their interconnections are manufactured during the same process, analogous to integrated electronic circuits. The planar waveguide circuit technology is advantageous to discrete components when multiple splitters are used and when it is desired to manufacture many identical circuits. Furthermore, the split ratios obtained using planar waveguide circuit technology can be wavelength independent and therefore more uniform than discrete optical power splitters.

The optical power splitting network circuit 20 provides several other advantages. For instance, a single optical power splitting network circuit 20 can provide a plurality of different power splitting functions by integrating optical power splitters onto a single substrate. Also, whereas individual power splitters would have to be individually coupled to fibers, the optical circuit 20 can simultaneously couple fibers in a fiber ribbon array to the ports P of a circuits 20 ganged on a single chip. As a result, the time needed to couple a number of power splitters to their respective fibers is substantially reduced.

Figure 3:
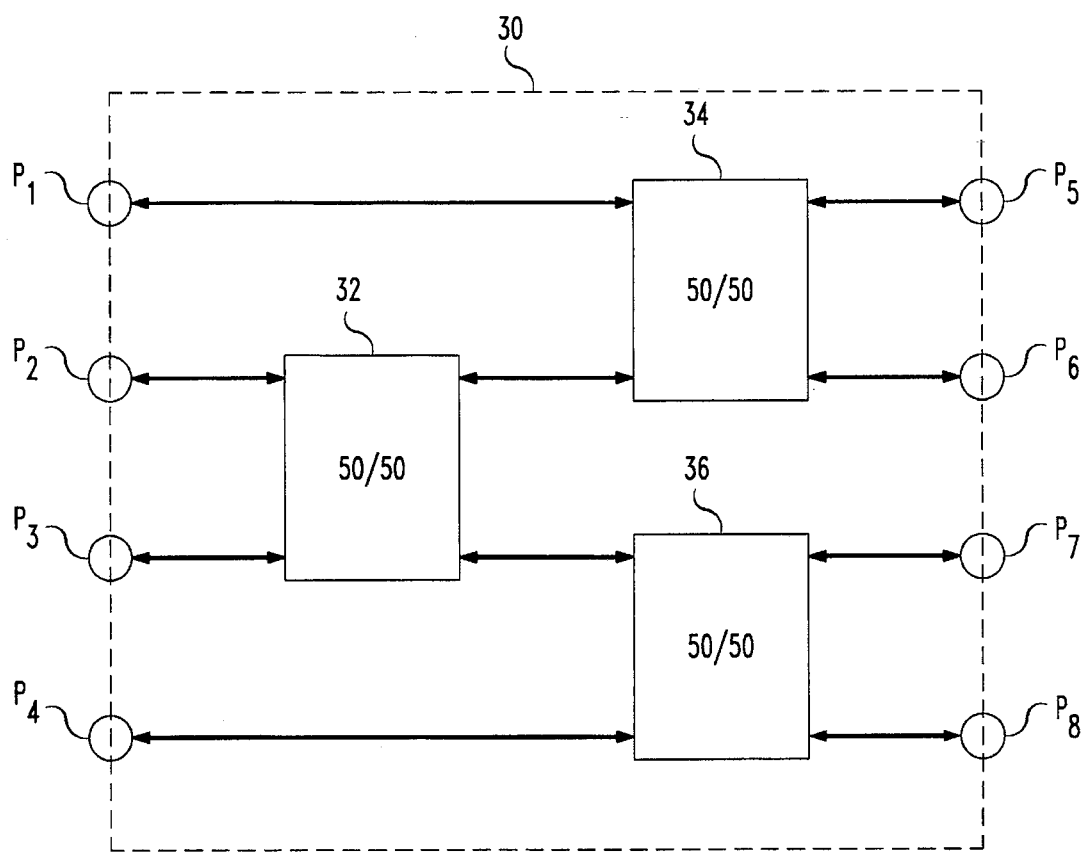
FIG. 3 is a block diagram of an optical integrated circuit according to a second embodiment of the invention.

With reference to FIG. 3, an optical circuit 30 according to a second embodiment of the invention comprises a first power splitter 32, a second power splitter 34, and a third power splitter 36. The circuit 30 has eight ports $P_1$ to $P_8$ with each port P being bi-directional so that light can either enter or exit the optical circuit 30 through any port P.

The first power splitter 32 is connected on one side to the second and third ports $P_2$ and $P_3$ and to the first power splitter 34 and the second power splitter 36 on its other side. When light is received on either one of the second or third ports $P_2$ and $P_3$, the first power splitter 32 divides the light into two equal portions and routes the light to the second power splitter 34 and to the third power splitter 36. Conversely, light from either of the first or second power splitters 34 or 36 is divided by the first power splitter 32 into two equal portions and routed to the second and third ports $P_2$ and $P_3$.

The second power splitter 34 is connected to the first port $P_1$ and to the first power splitter 32 on one side and to the fifth and sixth ports $P_5$ and $P_6$ on its other side. The second power splitter 34 divides the light from either the first port $P_1$ or the first power splitter 32 into two equal portions and routes these portions onto the fifth and sixth ports $P_5$ and $P_6$. Also, light from either of the fifth and sixth ports $P_5$ or $P_6$ is divided by the second power splitter 34 into two equal portions and routed to the first port $P_1$ and to the first power splitter 32.

The third power splitter 36 is connected to the first power splitter 32 and to the fourth port $P_4$ on its one side and to the seventh and eighth ports $P_7$ and $P_8$ on its other side. The third power splitter 36 divides light from either the first power splitter 32 or the fourth port $P_4$ into two equal portions and routes the two portions to the seventh and eighth ports $P_7$ and $P_8$. The third power splitter 36 also divides light from either of the seventh or eighth ports into two equal portions and routes the two portions to the first power splitter 32 and to the fourth port $P_4$.

The optical circuit 30 is a multi-purpose circuit since it provides several types of power splitting functions depending upon the port that the light enters. When light enters the first port $P_1$, the light is directed to the second power splitter 34 where it is divided into two equal portions and routed to the fifth and sixth ports $P_5$ and $P_6$.

In a similar manner, when light enters the fourth port $P_4$, the third power splitter 36 divides the light into two equal portions and routes the two portions to the seventh and eighth ports $P_7$ and $P_8$. Thus, when light enters either the first or fourth ports $P_1$ or $P_4$, the optical circuit 30 operates solely as a 1×2 splitter according to the ratios in power splitters 34 and 36, respectively.

In addition to operating as a 1×2 power splitter, the optical splitting network circuit 30 can also operate as a 1×3 power splitter. When light enters the sixth port $P_6$, the light is first divided into two equal portions by the second power splitter 34 and routed to the first port $P_1$ and to the first power splitter 32. The first power splitter 32 then divides the light from the second power splitter 34 into two equal portions and routes these two equal portions to the second and third ports $P_2$ and $P_3$. The light exiting the optical power splitting network circuit 30 through the first port $P_1$ therefore comprises 50% of the power from the light entering at port $P_6$ and the light exiting the optical circuit 30 at ports $P_2$ and $P_3$ each comprises 25% of the power from the light entering at port $P_6$. A 1×3 power splitter can also be obtained by inputting light at ports $P_5$, $P_7$, or $P_8$. As is apparent, the ratio of X:Y:Z of the 1×3 power splitter is the combination of the bar and cross-states of the two power splitters defining the 1×3 power splitter.

The optical power splitting network circuit 30 further provides a 1×4 power splitting function. When light enters either the second or third ports $P_2$ or $P_3$ the light is first divided into two equal portions by the first power splitter 32 and routed to the second and third power splitters 34 and 36. The second power splitter 34 divides the light from the first power splitter 32 into two equal portions and routes these two portions to ports $P_5$ and $P_6$. The third power splitter 36 also divides the light from the first power splitter 32 into two equal portions and routes these two portions to ports $P_7$ and $P_8$. Thus, light entering the second or third ports $P_2$ or $P_3$ is divided into four equal portions which are routed to the fifth to eighth ports $P_5$ to $P_8$, respectively.

As with the optical circuit 20, the optical power splitting network circuit 30 is an integrated optical circuit with the power splitters 32, 34, and 36 and each of the ports $P_1$ to $P_8$ being fabricated on a single substrate. By integrating the optical power splitters 32, 34, and 36 onto a single power splitting network circuit 30, a single optical circuit 30 can provide various power splitting functions. As shown above, the optical circuit 30 can operate as two 1×2 power splitters, a 1×3 power splitter, or as a 1×4 power splitter. The optical power splitting network circuit 30 is therefore more versatile than a single power splitter since it can serve various power splitting functions whereas a single power splitter is limited to just one fixed ratio. Since the optical power splitting network circuit 30 can perform these multiple power splitting functions, an inventory of the circuits 30 can provide all of the above-described power splitting functions.

The power splitting ratios of the power splitters 22 and 24 in optical circuit 20 and the power splitting ratios of the power splitters 32, 34, and 36 in optical circuit 30 are only examples of possible power splitting ratios that can be embodied in an integrated circuit. As should be apparent, the individual power splitters may have other power splitting ratios. With the above described power splitting ratios for the power splitters, however, the optical circuits 20 and 30 cover some of the more commonly used power splitting ratios, such as 50:50, 67:33, 50:25:25, 50:33:17, 33:33:33, and 25:25:25:25. The optical circuits 20 and 30, however, are not limited to these specific power splitting ratios but may alternatively have other power splitting ratios.

For waveguide to fiber alignment purposes, the spacing of the ports on the optical power splitting network circuits 20 and 30 can be fabricated identical to the spacing of fibers in a ribbon. The optical circuit 30 has therefore been designed ideally for a four fiber ribbon array while the optical power splitting network circuit 20 has been ideally designed for a three ribbon fiber array. As will be apparent to those skilled in the art, the optical power splitting network circuits 20 and 30 can be repeated for larger size ribbon arrays, such as a twelve fiber ribbon array. With a twelve fiber ribbon array, the optical circuit 30 may be repeated three times on a single substrate and the optical circuit 20 may be repeated four times on a single chip. Additionally, an integrated circuit may be formed with combinations of the optical power splitting network circuit 20 and the optical power splitting network circuit 30. Other variations should be apparent to those skilled in the art. The process of simultaneously aligning multiple fibers to the waveguides significantly reduces the time and cost of fiber attachment to planar waveguide chips.

The optical integrated circuits 20 and 30 according to the invention are much less expensive than circuits comprised of discrete elements. The cost of a circuit comprised of discrete elements increases with each additional discrete component and with each additional interconnection between two or more components. In contrast, the cost of an optical integrated circuit according to the invention is fairly independent of the number of components in the circuit or on the number of interconnections between components and is limited by the size of the optical chip's substrate. In other words, additional components, such as multiple power splitters, can be added to a circuit with only a nominal increase in cost.

The optical power splitting network circuits 20 and 30 present other advantages as well. For instance, the smaller size of the optical power splitting network circuits 20 and 30, in comparison to circuits formed with discrete components, will consume a smaller amount of space and will therefore provide additional space where the circuits 20 and 30 are being placed, such as in a shelf or closure. As a result, the optical circuits 20 and 30, as well as adjacent components in the shelf or closure, can be more readily accessed. An optical circuit according to the invention can also have built-in back-up circuit redundancy. With reference to optical power splitting network circuit 30, the circuit 30 has a power splitter 34 for dividing light evenly into two outputs and also a power splitter 36 for dividing light evenly into two outputs. Thus, if one of the two power splitters 34 or 36 should fail, the other power splitter 34 or 36 would be available for evenly dividing the light into two portions.

The foregoing has been illustrative of the features and principles of the present invention. Various changes or modifications to the invention may be apparent to those with skill in the art without departure from the spirit and scope of the invention, For example, while each of the power splitters in circuits 20 and 30 are 2×2 power splitters, an optical circuit according to the invention may employ other types of power splitters, such as 1×2 power splitters, 1×3 power splitters, 2×3 power splitters, etc. Also, although the invention is described as being fabricated by planar waveguide technology, the optical power splitting network circuits 20 and 30 may be fabricated as an integrated circuit in any suitable manner or even from discrete components.

Moreover, while only two embodiments of optical power splitter network circuits have been disclosed, namely circuit 20 with two optical power splitters 22 and 24 and circuit 30 with three optical power splitters 32, 34, and 36, a network power splitter circuit according to the invention can have any practical number of simple splitters networked together to form a compound optical power splitter network circuit. While the two embodiments of circuits 20 and 30 show compound 3×3 circuits and 4×4 circuits, respectively, the invention is applicable to any network of power splitters having an output from one splitter coupled to the input of another splitter or to an output port.

I claim:

1. An optical circuit for providing multiple power splitting functions, comprising:

first, second, third, fourth, fifth, and sixth optical ports with each of said first to sixth ports capable of both inputting light into said optical circuit and outputting light from said optical circuit;

a first power splitter; and a second power splitter;

said first power splitter connected to said first, second, and fourth ports and to said second power splitter, light from one of said first or second ports being split with a first fraction of the light going to said fourth port and a second fraction of the light going to said second power splitter and wherein light from one of said fourth port or said second power splitter being split with said first fraction of the light going to said first port and said second fraction of the light going to said second port;

said second power splitter connected to said third, fifth, and sixth ports and to said first power splitter, light from one of said fifth or sixth ports being split with a third fraction of the light going to said first power splitter and a fourth fraction of the light going to said third port and wherein light from one of said first power splitter or said third port being split with said third fraction of the light going to said fifth port and said fourth fraction of the light going to said sixth port;

wherein said first, second, third and fourth fractions are each less than 1 and said optical circuit provides at least a 1×2 power splitting function and a 1×3 power splitter function.

2. The optical circuit as set forth in claim 1, wherein said first fraction is ⅔, said second fraction is ⅓, said third fraction is ½, and said fourth fraction is ½.

3. The optical circuit as set forth in claim 2, wherein said first power splitter and said second power splitter divide light entering said first port such that said light is divided into three equal portions and exits from said fourth, fifth, and sixth ports, respectively.

4. The optical circuit as set forth in claim 2, wherein said first power splitter and said second power splitter divide light entering said sixth port such that said light is divided into a first portion equal to 50% of said light, a second portion equal to 33% of said light, and a third portion equal to 17% of said light, said first, second, and third portions exiting from said third, first, and second ports, respectively.

5. The optical circuit as set forth in claim 2, wherein said first power splitter divides light entering said fourth port such that said light is divided into a first portion equal to 67% of said light and output on said second port and a second portion equal to 33% of said light and output on said first port.

6. The optical circuit as set forth in claim 2, wherein said second power splitter divides light entering said third port such that said light is divided into two equal portions and output on said fifth and sixth ports, respectively.

7. The optical circuit as set forth in claim 1, wherein said first fraction added to said second fraction is equal to 1.

8. The optical circuit as set forth in claim 1, wherein said third fraction added to said fourth fraction is equal to 1.

9. The optical circuit as set forth in claim 1, wherein said first power splitter, said second power splitter, and a first set of interconnections between said first power splitter and said second power splitter, said first port, said second port, and said fourth port, and a second set of interconnections between said second power splitter and said third port, said fifth port, and said sixth port are all fabricated on an optical integrated circuit.

10. The optical circuit as set forth in claim 1, wherein said second power splitter divides light entering said third port into two equal portions which are routed to said fifth and sixth ports, respectively, and said second power splitter simultaneously divides light entering said fourth port into two portions equal to 67% and 33% of the entering light which are routed to said second and first ports, respectively.

11. An optical circuit for providing multiple power splitting functions, comprising:

first, second, third, fourth, fifth, sixth, seventh, and eighth optical ports with each of said first to eighth ports capable of both inputting light into said optical circuit and outputting light from said optical circuit;

a first power splitter;

a second power splitter; and a third power splitter;

said first power splitter connected to said first, fifth, and sixth ports and to said second power splitter, light from one of said first port or second power splitter being split with a first fraction of the light going to said fifth port and a second fraction of the light going to said sixth port and wherein light from one of said fifth or sixth ports being split with said first fraction of the light going to said first port and said second fraction of the light going to said second power splitter;

said second power splitter connected to said second and third ports, to said first power splitter, and to said third power splitter, light from one of said second or third ports being split with a third fraction of the light going to said first power splitter and a fourth fraction of the light going to said second power splitter and wherein light from one of said first or second power splitters being split with said third fraction of the light going to said second port and said fourth fraction of the light going to said third port;

said third power splitter connected to said fourth, seventh, and eighth ports and to said second power splitter, light from one of said second power splitter or fourth port being split with a fifth fraction of the light going to said seventh port and a sixth fraction of the light going to said eighth port and wherein light from one of said seventh or eighth ports being split with said fifth fraction of the light going to said second power splitter and said sixth fraction of the light going to said fourth port;

wherein said first, second, third, fourth, fifth, and sixth fractions are each less than 1 and said optical circuit provides at least a 1×2 power splitting function, a 1×3 power splitter function, and a 1×4 power splitting function.

12. The optical circuit as set forth in claim 11, wherein each of said first, second, third, fourth, fifth, and sixth fractions is ½.

13. The optical circuit as set forth in claim 12, wherein said first power splitter divides light entering said first port such that said light is divided into two equal portions and output on said fifth and sixth ports, respectively.

14. The optical circuit as set forth in claim 12, wherein said third power splitter divides light entering said fourth port such that said light is divided into two equal portions and output on said seventh and eighth ports, respectively.

15. The optical circuit as set forth in claim 12, wherein said first power splitter, said second power splitter, and said third power splitter divide light entering said third port such that said light is divided into four equal portions which are output on said fifth, sixth, seventh, and eighth ports, respectively.

16. The optical circuit as set forth in claim 12, wherein said first power splitter and said second power splitter divide light entering said sixth port such that said light is divided into a first portion equal to 50% of said light and output on said first port, a second portion equal to 25% of said light and output on said second port, and a third portion equal to 25% of said light and output on said third port.

17. The optical circuit as set forth in claim 11, wherein said first fraction added to said second fraction is equal to 1.

18. The optical circuit as set forth in claim 11, wherein said third fraction added to said fourth fraction is equal to 1.

19. The optical circuit as set forth in claim 11, wherein said fifth fraction added to said sixth fraction is equal to 1.

20. The optical circuit as set forth in claim 11, wherein said first power splitter, said second power splitter, said third power splitter, a first set of interconnections between said first power splitter and said second power splitter, said first port, said fifth port, and said sixth port, a second set of interconnections between said second power splitter and said third power splitter, said second port, and said third port, and a third set of interconnections between said third power splitter and said fourth port, said seventh port, and said eighth port are all fabricated on an optical integrated circuit.

21. The optical circuit as set forth in claim 11, wherein said first power splitter divides light entering said first port into two equal portions which are routed to said fifth and sixth ports, respectively, and said third power splitter simultaneously divides light entering said fourth port into two equal portions which are routed to said seventh and eighth ports, respectively.

22. An optical integrated circuit, comprising:

a first optical power splitter and a second optical power splitter formed on a single substrate having first to sixth ports with each port being able to conduct light both into and out of said optical integrated circuit;

said first optical power splitter, having a first ratio for dividing entering light, and being connected to first, second, and fourth ports of said optical integrated circuit and to said second power splitter;

said second optical power splitter, having a second ratio for dividing entering light, and being connected to said first power splitter and to third, fifth, and sixth ports of said optical integrated circuit;

wherein said first optical power splitter divides light entering said fourth port according to a first 1×2 power splitting function, said second optical power splitter divides light entering said third port according to a second 1×2 power splitting function, said first and second optical power splitters divide light entering said first port according to a first 1×3 power splitting function, said first and second optical power splitters divide light entering said second port according to a second 1×3 power splitting function, said first and second optical power splitters divide light entering said fifth port according to a third 1×3 power splitting function, and said first and second optical power splitters divide light entering said sixth port according to a fourth 1×3 power splitting function.

23. The optical integrated circuit as set forth in claim 22, wherein said first ratio is 67:33 and said second ratio is 50:50.

24. An optical integrated circuit, comprising:

a first optical power splitter, a second optical power splitter, and a third optical power splitter formed on a single substrate having first to eighth ports with each port being able to conduct light both into and out of said optical integrated circuit;

said first optical power splitter, having a first ratio for dividing entering light, and being connected to the first, fifth, and sixth ports of said optical integrated circuit and to said second power splitter;

said second optical power splitter, having a second ratio for dividing entering light, and being connected to said first power splitter, to said third power splitter, and to the second and third ports of said optical integrated circuit;

said third optical power splitter, having a third ratio for dividing entering light, and being connected to said second power splitter and to the fourth, seventh, and eighth ports of said optical integrated circuit;

wherein said first power splitter divides light entering said first port according to a first 1×2 power splitting function, said third power splitter divides light entering said fourth port according to a second 1×2 power splitting function, said first and second optical power splitters divide light entering said fifth to eighth ports according to first to fourth 1×3 power splitting functions, respectively, and said first, second, and third optical power splitters divide light entering said second or third ports according to first and second 1×4 power splitting functions.

25. The optical integrated circuit as set forth in claim 24, wherein said first ratio is 50:50, said second ratio is 50:50, and said third ratio is 50:50.

* * * * *